US008018377B2

(12) United States Patent
Collins

(10) Patent No.: US 8,018,377 B2
(45) Date of Patent: Sep. 13, 2011

(54) DECOUPLED CLOCK MODEL WITH AMBIGUITY DATUM FIXING

(75) Inventor: John Paul Collins, Ottawa (CA)

(73) Assignee: Her Majesty the Queen in Right of Canada as represented by the Minister of Natural Resources, Ottawa (CA)

( * ) Notice: Subject to any disclaimer, the term of this patent is extended or adjusted under 35 U.S.C. 154(b) by 108 days.

(21) Appl. No.: 12/358,928

(22) Filed: Jan. 23, 2009

(65) Prior Publication Data
US 2010/0188285 A1    Jul. 29, 2010

(51) Int. Cl.
*G01S 19/44* (2010.01)
*G01S 19/43* (2010.01)

(52) U.S. Cl. .............................. 342/357.27; 342/357.26

(58) Field of Classification Search ............ 342/357.26, 342/357.27, 357.31, 357.38; 701/207, 213
See application file for complete search history.

(56) References Cited

U.S. PATENT DOCUMENTS

| | | | |
|---|---|---|---|
| 5,477,458 A | 12/1995 | Loomis | |
| 5,621,646 A | 4/1997 | Enge et al. | |
| 5,828,336 A | 10/1998 | Yunck et al. | |
| 5,963,167 A | 10/1999 | Lichten et al. | |
| 6,166,683 A | 12/2000 | Hwang | |
| 6,167,347 A | 12/2000 | Lin | |
| 6,205,400 B1 | 3/2001 | Lin | |
| 6,229,479 B1 | 5/2001 | Kozlov et al. | |
| 6,246,960 B1 | 6/2001 | Lin | |
| 6,256,583 B1 | 7/2001 | Sutten | |
| 6,278,945 B1 | 8/2001 | Lin | |
| 6,292,750 B1 | 9/2001 | Lin | |
| 6,311,129 B1 | 10/2001 | Lin | |
| 6,424,914 B1 | 7/2002 | Lin | |
| 6,427,122 B1 | 7/2002 | Lin | |
| 6,449,559 B2 | 9/2002 | Lin | |
| 6,496,778 B1 | 12/2002 | Lin | |
| 6,516,272 B2 | 2/2003 | Lin | |
| 6,697,736 B2 | 2/2004 | Lin | |
| 6,753,810 B1 | 6/2004 | Yang et al. | |
| 6,816,117 B2 | 11/2004 | Fink et al. | |
| 6,879,913 B1 * | 4/2005 | Yu .................................. | 701/214 |
| 7,102,563 B2 | 9/2006 | Rapoport et al. | |
| 7,221,314 B2 | 5/2007 | Brabec et al. | |
| 2006/0074558 A1 * | 4/2006 | Williamson et al. .......... | 701/213 |

OTHER PUBLICATIONS

Abdel-Salam et al., "Ambiguity Resolution in Precise Point Positioning: Preliminary Results," Sep. 9-12, 2003, 7 pgs., ION GNSS, Portland, OR.

Defraigne et al., "On the link between GPS pseudorange noise and day-boundary discontinuities in geogetic time transfer solutions," 2007, 11 pgs. Royal Observatory of Belgium, Brussels, Belgium.

(Continued)

*Primary Examiner* — Dao L Phan
(74) *Attorney, Agent, or Firm* — Baker & Daniels LLP

(57) ABSTRACT

The present invention relates to a method of processing Global Positioning System (GPS) carrier phase and pseudorange information. Dual-frequency carrier phase and pseudorange measurements from GPS receivers are processed by specifying separate oscillator parameters for the carrier phase and pseudorange measurements. Carrier phase estimates of errors of the oscillator are arbitrarily biased with respect to the pseudorange estimates, and ambiguity parameters are constrained to be integer-valued. Isolating the ambiguities as integer valued parameters provides extra information that can be exploited to maximize the use of GPS and other Global Navigation Satellite Systems.

29 Claims, 3 Drawing Sheets

OTHER PUBLICATIONS

Delporte, et al., "Fixing integer ambiguities for GPS carrier phase time transfer," at least as early as Apr. 6, 2007, 6 pgs., CNES—French Space Agency, Toulouse, France.

Guyennon et al., Further Characterization of the Time Transfer Capabilities of Precise Point Positioning (PPP), at least as early as Jan. 20, 2009, 6 pgs., Time and Frequency Metrology Dept., Instituto Nazionale di Ricerca Metrologica, Torino, Italy.

Laurichesse et al., "Integer ambiguity resolution on undifferenced GPS phase measurements and its application to PPP," Sep. 25-28, 2007, 10 pgs., ION GNSS 20th International Technical Meeting of the Satellite Division, Fort Worth, TX.

Leandro et al., "Wide Area Based Precise Point Positioning," Sep. 26-29, 2006, 7 pgs., ION GNSS 19th International Technical Meeting of the Satellite Division, Fort Worth, TX.

Maorong, Abstract for: "Integer ambiguity fixing for GPS precise point positioning," at least as early as May 28, 2007, Dept. of Geodesy and Remote Sensing, Potsdam, Germany.

Wang et al., "GPS Un-Differenced Ambiguity Resolution and Validation," Sep. 26-29, 2006, 9 pgs., ION GNSS 19th International Technical Meeting of the Satellite Division, Fort Worth, TX.

Collins, John Paul, "Isolating and Estimating Undifferenced GPS Integer Ambiguities," Jan. 30, 2008, 13 pgs., Institute of Navigation, National Technical Meeting 2008, San Diego, California.

* cited by examiner

DECOUPLED CLOCK MODEL WITH AMBIGUITY DATUM FIXING

TECHNICAL FIELD

A decoupled clock model with ambiguity datum fixing is provided. More particularly, a method of processing carrier phase and pseudorange measurements from, consecutively, a network of receivers, and a single receiver is also provided.

BACKGROUND

A key issue in Global Navigation Satellite Systems (GNSS), including the original Global Positioning System (GPS), is the isolation and estimation of the integer ambiguity of the carrier phase measurements. Achieving integer ambiguity resolution of undifferenced carrier phase measurements has been a significant topic of interest for the geodetic and navigation communities for many years.

The carrier phase signals of any GNSS are approximately two orders of magnitude more precise than the primary pseudorange signals the systems provide. However, measurements of the carrier phases are ambiguous relative to those of the pseudoranges by an unknown number of integer cycles. Resolution of these ambiguities provides centimeter to millimeter-level pseudorange measurements compared to the decimeter to meter level of the inherent pseudoranges. The improvement in measurement precision is directly carried into the parameters estimated from the measurements.

The ambiguities are currently only resolved as integers in so-called double difference processing whereby dual-pairs of measurements (made for example from two receivers to the same two satellites) are differenced to produce one measurement. The differencing is carried out primarily to remove common transmitter and receiver biases contained in the measurements. The biases consist primarily of the oscillator-induced time delays of both the satellite and the receiver. The existence of these biases is why the measurements are 'pseudoranges' and not just 'ranges'.

The primary disadvantage of double differencing is the requirement to have at least two receivers, even for a single user who only requires his own location. This essentially turns point positioning into baseline, or relative, positioning. This technique can be very limited in baseline length if such error sources as orbits and ionosphere are required to cancel out.

As an alternative to double differencing, it is possible to process undifferenced measurements and estimate the biases explicitly. It can be shown that the two solutions are mathematically identical under certain circumstances. At the same time however, it is not possible to explicitly isolate the integer nature of the ambiguities due to their exact linear correlation with time delays due to the oscillators and other hardware. The higher precision of the carrier phase can still be accessed by estimating a random constant bias in place of the ambiguity; however, such a parameter requires an extended convergence period.

The processing of undifferenced pseudorange and carrier phase observables from a single receiver is referred to as Precise Point Positioning (PPP). PPP returns in effect to the first principles of GPS, where the focus is again placed on a single receiver. The main challenge with PPP is the significant convergence period required before a suitable solution precision is achieved. This convergence period is the most significant factor limiting wider adoption of PPP. If the ambiguity could be isolated and estimated as an integer value then, in principle, the integer nature represents more information that could be exploited to accelerate convergence.

Accordingly, integer ambiguity resolution of undifferenced carrier phase observables has been an elusive goal in GPS processing, largely since the advent of the PPP method. Some recent advances in isolating integer ambiguities have been made with techniques that use single differences and undifferenced observables. However, it is not clear that all aspects of the problem have been addressed, particularly with respect to time-varying code biases that are not explicitly accounted for in those techniques.

The term 'code biases' generally refers to unmodelled common-mode errors of the pseudoranges, usually considered to be hardware or local environment delays, that are either constant or believed to vary in a band-limited, quasi-random, manner. There appears to be general acceptance in the timing community that these biases are the cause of the so-called 'day-boundary clock jumps' highlighted by the time scale of the International GNSS Service (IGS). The term 'phase biases' refers to corresponding delays of the carrier phases.

It is stated that the limiting factor in ambiguity resolution using undifferenced GPS observables is the presence of both code and phase biases in the estimates of the ambiguities. As parameterised in the "standard model" of undifferenced pseudoranges and carrier phases, the datum for the station and satellite clock parameters is provided by the pseudoranges. The consequence of this is that the estimated ambiguities contain the time-constant portions of both code and phase biases.

The standard GPS dual-frequency pseudorange (code) and carrier phase (phase) observation equations are typically written in the form:

$$P_1 = \rho + T + I + c(dt^r - dt^s) + b^r_{P1} - b^s_{P1} + \varepsilon_{P1}$$

$$P_2 = \rho + T + q^2 I + c(dt^r - dt^s) + b^r_{P2} - b^s_{P2} + \varepsilon_{P2}$$

$$\lambda_1(\Phi_1 + N_1) =$$

$$L_1 = \rho + T - I + c(dt^r - dt^s) + b^r_{L1} - b^s_{L1} + \varepsilon_{L1}$$

$$\lambda_2(\Phi_2 + N_2) =$$

$$L_2 = \rho + T - q^2 I + c(dt^r - dt^s) + b^r_{L2} - b^s_{L2} + \varepsilon_{L2}$$

where $P_i$ is a pseudorange measurement made at frequency i and $\Phi_i$ is a carrier phase measurement made at frequency i. We write the integer ambiguity $N_i$ on the left side to show how it converts the ambiguous phase measurement $\Phi_i$ into a precise pseudorange $L_i$. The factor q represents the ratio of the primary and secondary GPS frequencies, c is the vacuum speed of light and $\lambda_i$ is the frequency-dependent wavelength of the carrier phase measurements. Of the geometric parameters, $\rho$ represents the geometric range between transmitter and receiver antennas, T is the range delay caused by signal propagation through the lower atmosphere (predominantly the Troposphere), and I is the range delay and apparent phase advance on the primary frequency caused by signal propagation through the upper atmosphere (predominantly the Ionosphere). The remaining, non-geometric, parameters are the oscillator or 'clock' errors for both the transmitter and receiver ($dt^s$ and $dt^r$ respectively), and common-oscillator hardware biases ($b_*^*$) for each observation. Unmodelled random or quasi-random errors are represented by $\varepsilon_*$.

The usual practice when processing dual-frequency measurements is to take advantage of the frequency-dependence of the ionospheric delay (to first order) and linearly combine two pseudoranges and two carrier phases to produce ionosphere-free observables:

$$P_3 = \rho + T + c(dt^r - dt^s) + b_{P3}^r - b_{P3}^s + \epsilon_{P3}$$

$$L_3 = \rho + T + c(dt^r - dt^s) + b_{L3}^r - b_{L3}^s - \lambda_3 N_3 \epsilon_{L3}$$

where:

$$P_3 = \frac{(77^2 P_1 - 60^2 P_2)}{(77^2 - 60^2)}, \quad L_3 = \frac{(77^2 L_1 - 60^2 L_2)}{(77^2 - 60^2)}$$

and the ionosphere-free ambiguity combination $N_3 = 77N_1 - 60N_2$ is placed on the right-hand side to indicate that it is now treated as a parameter to be estimated from the data.

As they stand, these equations are over-parameterised, and any system of normal equations derived from them for the purposes of a least squares solution will be singular. There are two causes of deficiency. The first is that the clock errors are inherently differenced and cannot be uniquely separated. This is overcome in a network solution by fixing one of the station clocks, and in a single-receiver solution by fixing the satellite clocks. The remaining singularity is due to the presence of the hardware biases and their identical functional behavior with the associated clock parameters. Both these types of parameter represent common-mode time delays and having constant partial derivatives are not uniquely separable.

To explicitly deal with this singularity, equivalent equations can be written with clock and code bias parameters combined. At the same time, due to the uniquely ambiguous nature of the carrier phase, the combined clock and bias parameter can be carried over to the phase observable:

$$P_3 = \rho + T + c(dt_{P3}^r - dt_{P3}^s) + \epsilon_{P3}$$

$$L_3 = \rho + T + c(dt_{P3}^r - dt_{P3}^s) + A_{P3} + \epsilon_{L3}$$

where $c \cdot dt_{P3}^* = c \cdot dt^* + b_{P3}^*$, and compensating code biases plus the phase biases and the ambiguity are combined into one parameter:

$$A_{P3} = b_{L3}^r - b_{P3}^r - b_{L3}^s + b_{P3}^s - \lambda_3 N_3$$

which is sometimes referred to as the 'float ambiguity' because it is not integer valued. The justification for grouping these parameters is that they are all functionally identical (constant partial derivatives) and as a random bias, the integer ambiguity cannot be independently predicted a-priori.

These equations will be referenced as the standard model for dual-frequency undifferenced processing, despite being in what may appear to be a non-standard form. These equations correctly represent the combined effect of common-mode code-biases, common-observation clocks and random bias ambiguities. The net effect is that the ambiguity parameter of the standard model contains both phase and code time-constant biases.

It is re-stated that the standard model of undifferenced ionosphere-free observables is sub-optimal, in that the estimated ambiguities contain the constant code as well as phase biases. Should the code or phase biases also vary over time, then the standard model is even less accurate, and any such variations must be accommodated by the other estimated parameters. For the standard model this will be primarily the clocks and ambiguities.

Prior systems have not addressed this problem. For example, U.S. Pat. Nos. 5,621,646 and 5,828,336 both describe systems to compute GPS user corrections from wide-area ground networks. Both refer to using ionosphere-free pseudoranges explicitly smoothed with the carrier phase measurements, or averaged pseudoranges as estimates for the carrier ambiguity. The latter patent describes a process to explicitly estimate the ionosphere through which the measurements pass, wherein the existence of "instrumental biases" in both the receiver and satellite transmitter is acknowledged. The differing nature of code biases versus phase biases is not acknowledged and neither is the impact on standard model processing for positioning, etc. U.S. Pat. No. 5,963,167 (which is a development of U.S. Pat. No. 5,828, 336) describes a more comprehensive analysis package for processing GPS observations. This patent refers briefly to the fixing of double-difference ambiguities in a network solution, but without significant detail and not for an isolated user.

U.S. Pat. No. 6,697,736 B2 relates to a positioning and navigation method and system combining GPS with an Inertial Navigation System. The objective of this patent is to provide a positioning and navigation method and system, in which the satellite signal carrier phase measurements, as well as the pseudoranges of the Global Positioning System are used in a Kalman filter, so as to improve the accuracy of the integrated positioning solution. It is claimed that carrier phase ambiguities can be fixed, but the existence and effect of code and phase biases in the underlying mathematical model is not recognised.

SUMMARY

To address the limitations and problems of the prior art, a new GPS observation model is presented herein called the "decoupled clock model". This model rigorously accommodates any synchronisation biases due to hardware delays (constant or time-varying) that may occur between common-frequency observables and facilitates the estimation of integer ambiguities without explicit differencing.

The present invention provides a method for isolating and estimating the integer ambiguity of GPS carrier phase measurements. The method provides a solution based on arbitrarily biasing the carrier phase estimates of the oscillator errors compared to those made from the pseudorange measurements. Separate oscillator parameters are specified for the carrier phase and pseudorange measurements and the equations are solved by biasing the carrier phase estimates and at the same time constraining the remaining ambiguity parameters to be integer-valued.

Application of the decoupled clock model to both the standard model of ionosphere-free code and phase observables and the well known widelane-phase/narrowlane-code combination leads to an "extended model" whereby simultaneous resolution of 86 cm and 11 cm ambiguities is possible. The decoupled clock model is significantly more general than the standard model, requiring no assumption about the stability of code or phase biases. Detailed knowledge of the source of the biases is not required provided that each set of received signals is affected identically. Hence, the terms 'instrumental biases', 'hardware biases', 'common-mode biases', etc., are synonymous.

The decoupled model can be applied to both network and single-user processing, where the network solution provides the satellite clocks required to be fixed by the user (one for each observable used). General application of the decoupled clock model helps explain some of the remaining issues with GPS processing, such as the "day-boundary clock jumps" identified by the IGS time scale, and, under some circumstances, improves the convergence time of Precise Point Positioning.

In summary, therefore, the present invention provides a method of processing undifferenced GPS carrier phase and pseudorange measurements, made at two frequencies, by one or more receivers, from a plurality of satellite transmitters, comprising the steps of: defining separate clock parameters for the carrier phase and pseudorange measurements; arbitrarily biasing phase estimates of oscillator errors with respect to the pseudorange estimates; and constraining the ambiguity parameters to be integer-valued.

Additionally, the present invention contemplates a method of determining GPS position information comprising the steps of: receiving GPS signals at one or more GPS receivers from a plurality of GPS satellite transmitters; obtaining from the GPS signals undifferenced GPS carrier phase and pseudorange measurements, made at two frequencies, at the one or more GPS receivers; defining separate clock parameters for the carrier phase and pseudorange measurements; arbitrarily biasing carrier phase estimates of oscillator errors with respect to pseudorange estimates; constraining the ambiguity parameters to be integer-valued; and determining the estimated position of the one or more GPS receivers based on the constraint of the estimated ambiguities.

Furthermore, the present invention contemplates a system for determining GPS position information comprising: one or more GPS receivers for receiving GPS signals from a plurality of GPS satellite transmitters; means for obtaining from the GPS signals undifferenced GPS carrier phase and pseudorange measurements, made at two frequencies, at the one or more GPS receivers; means for defining separate clock parameters for the carrier phase and pseudorange measurements; means for arbitrarily biasing carrier phase estimates of oscillator errors with respect to pseudorange estimates; means for constraining the ambiguity parameters to be integer-valued; and means for determining the estimated position of the one or more GPS receivers based on the constraint of the estimated ambiguities.

DESCRIPTION OF THE PREFERRED EMBODIMENTS

Figure 1:
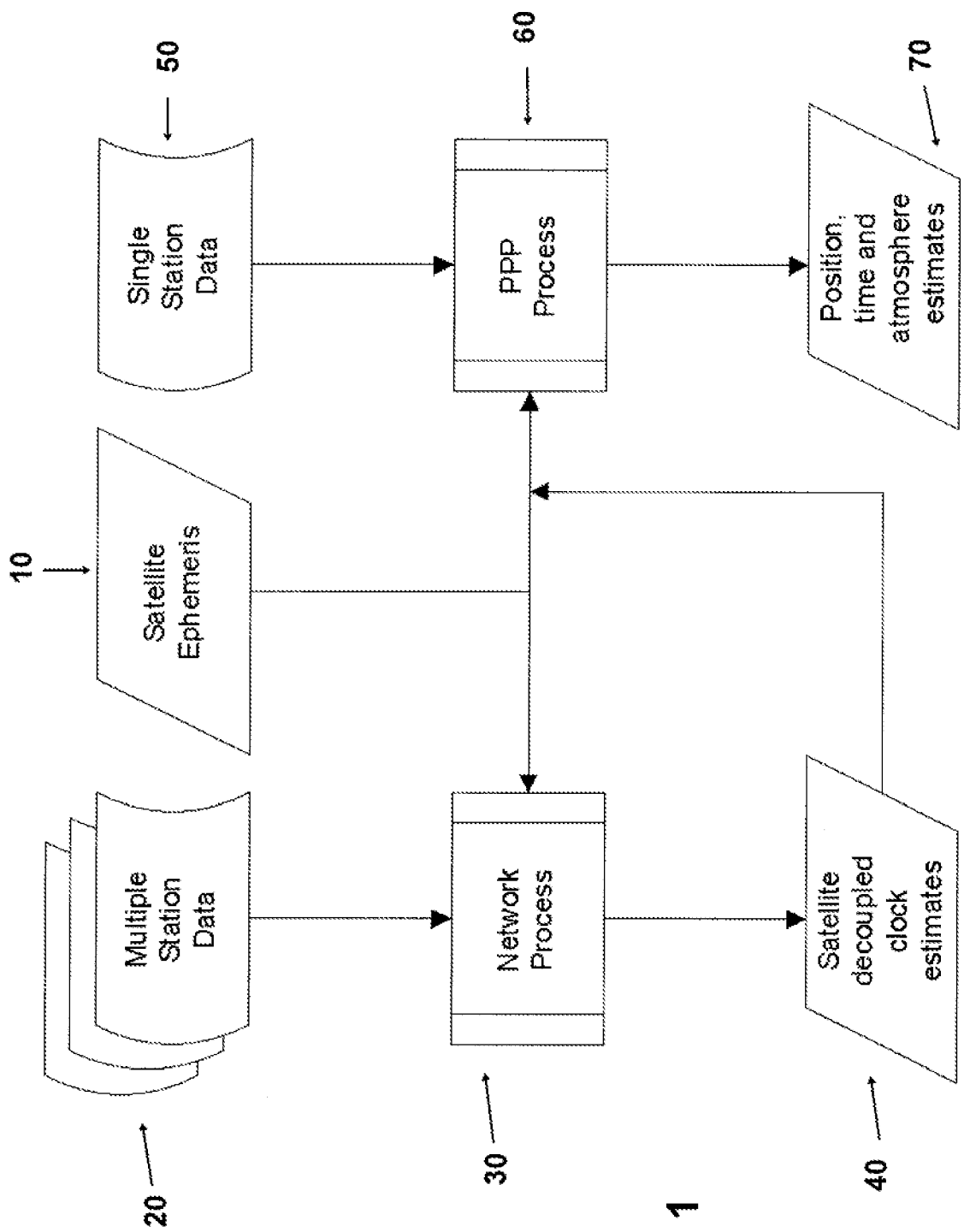
FIG. 1 is a flowchart showing the basic step to achieve integer ambiguity fixed estimates of position, time and atmosphere.

A process for determining a mathematical model of the carrier phase and pseudorange measurements is provided to isolate the integer ambiguity parameter. The "decoupled clock model" specifies separate oscillator parameters for carrier phase and pseudorange measurements. While this is known to be incorrect from a strictly mechanical point of view, it is known that the pseudorange measurements are subject to oscillator-like errors that do not occur on the carrier phases. At the same time it is likely that both types of measurement are transmitted and received at marginally different epochs of time, differences that are significant at the noise level of the carrier phases.

The specification of separate oscillator parameters produces a system of equations that is under-determined and ill-posed. To address this, sufficient mathematical constraints are provided so that the system of equations can be solved. This is done by a process of "ambiguity datum fixing", which involves arbitrarily fixing a subset of the ambiguities in the system of equations. This is only possible because of the separate carrier phase and pseudorange oscillator parameters. The net result is that the carrier phase estimates of the oscillator errors are arbitrarily biased with respect to those made from the pseudoranges. At the same time the remaining ambiguity parameters are functionally constrained to be integer-valued.

Neither the decoupling of the clock estimates nor the ambiguity datum fixing directly impacts the estimates of position, time or atmosphere that are usually of prime concern. These parameters are only affected once a significant set of ambiguities are resolved to their correct integer values. Thus, in the present invention separate oscillator parameters are mathematically specified for the carrier phase and pseudorange measurements and the resulting under-determined system of equations is constrained by the fixing of a subset of the ambiguity parameters to arbitrary integer values. These two steps rigorously accommodate all the oscillator-like errors experienced by the two measurement types and functionally isolate the ambiguity parameters as integers.

To implement these steps, the ionosphere-free observation equations are written with separate code and phase satellite and station clock parameters:

$$P_3 = \rho + T + c(dt_{P3}{}^r - dt_{P3}{}^s) + \epsilon_{P3}$$

$$L_3 = \rho + T + c(dt_{L3}{}^r - dt_{L3}{}^s) - \lambda_3 N_3 + \epsilon_{L3}$$

Separating the code and phase clock parameters in this way naturally models any common-mode time-delay signals unique to the pseudoranges or carrier phases. At the same time, the code biases are explicitly isolated from the phases and, in principle at least, the ambiguity parameters are functionally integer valued.

These equations represent a singular system and solving them is an example of rank-defect integer least-squares. From an analytical point-of-view, the primary implication of formulating separate code and phase clock parameters is that the datum provided by the pseudoranges has been removed from the carrier phases and therefore an alternative must be provided.

The effect of decoupling the code and phase estimates of the clock parameters is to make the system of equations singular again. However, the singular nature of the clock differences on the code and phases is now separate, and on the phases is matched by the singular nature of the ambiguities as well. The lack of a unique separation between the phase clocks and the ambiguities is exploited to provide enough constraints so that a least-squares solution can be solved at the first epoch of processing.

Even though it is the decoupling of the clock parameters that has created a singular solution, the overall singularity lies as much with the ambiguities as with the phase clocks. If the ambiguity parameters could be removed, the carrier phases would be no more singular than the pseudoranges. Fixing the ambiguities also enables provision of a replacement datum for the phase clocks by using the ambiguities to fill that role. Consequently, all that is required to provide a minimum-constraint least-squares solution when using the decoupled clock model is to arbitrarily fix one ambiguity associated with each estimated phase clock.

In a network solution, one of the phase clocks must be fixed as a network datum in addition to one of the code clocks. In a single-user solution the fixing of the satellite clocks (code and phase) provides the network datum from which to estimate the receiver clocks (code and phase).

The concept of fixing ambiguities as a datum is identical to the concept of fixing one of each clock as a network datum. In the same way that all clocks are then estimated relative to that clock, so with the decoupled clock model all the phase clocks are computed with respect to a network datum clock plus an ambiguity datum. Apart from an arbitrary bias, the formal nature of the phase clock estimates is unchanged relative to the standard model clock estimates.

The practical impact of fixing ambiguity datums ensures that any phase biases are associated with the underlying oscillator error to form a 'phase clock' parameter. At the same time fixing to integer values ensures the remaining ambiguities are functionally integer in nature. The effect can be considered as an implicit differencing effect.

Straightforward processing of ionosphere-free dual-frequency data with the decoupled clock model and ambiguity datum fixing provides solutions where the estimated ambiguities are functionally integer valued. However, for GPS $L_1/L_2$ processing explicit ambiguity fixing is not practicable because the ionosphere-free wavelength is too short ($\lambda_3$~6 mm) relative to the phase noise. In addition, the phase clock estimates will drift due to the inability to maintain datum continuity. Datum continuity becomes an issue when a datum ambiguity drops out of the solution and a new one must be chosen in its place. Strict datum continuity can only be maintained when the new datum ambiguity has converged to, or been fixed at, its correct integer value.

For GPS $L_1/L_2$ processing therefore, the widelane-phase/narrowlane-code combination is used to first fix the widelane ambiguity (wavelength ~86 cm) which in turn amplifies the ionosphere-free wavelength to that of the narrowlane (~11 cm). This step produces a model referred to as the "extended model", and is mandatory for integer ambiguity resolution with GPS $L_1/L_2$ processing. For $L_2/L_5$ processing with GPS-III for example, this step will not provide any benefit, because the ionosphere-free combination wavelength is already at 12.5 cm and widelane substitution has no effect.

The widelane-phase/narrowlane-code combination (also known as the Melbourne-Wübbena observable) is defined as $$A_4 = L_4 - P_6 = b_{44}{}^r - b_{44}{}^s - \lambda_4 N_4 + \epsilon_{44}$$

where $L_4 = (77\, L_1 - 60\, L_2)/17$ is the widelane phase combination and $P_6 = (77\, P_1 + 60\, P_2)/137$ is the narrowlane code combination. It is usual when using this combination to consider the station and satellite biases as constant, however this cannot generally be justified. Therefore, the decoupled clock model will be invoked and these biases will be treated as time-varying. At the same time ambiguity datum and network bias fixing is applied to introduce redundancy into the system. As a third step, this observable is processed simultaneously with $P_3$ and $L_3$ to provide a homogeneous system of equations. In theory this step should only be undertaken with rigorous error propagation from the raw $P_1$, $P_2$, $L_1$ and $L_2$ observables, however the relative correlation between $A_4$ and $P_3$ and $L_3$ is theoretically small enough that it is possible to ignore it in practice.

Since the decoupled clock model is a generic processing model, it can be applied directly to Precise Point Positioning with the advantage that it facilitates Ambiguity Resolution (PPP-AR). Just as for standard PPP, PPP-AR requires precise orbit and clock corrections for each observed satellite, but in this case each observable requires its own satellite clock parameter, namely a carrier phase clock, a pseudorange clock, and a widelane (clock-like) bias. The source of such corrections can only be a network solution using the decoupled clock model. Standard model clock corrections, such as those provided by the IGS, cannot facilitate PPP-AR because they contain constant code biases and do not contain the phase biases. Because time synchronisation alone is the key to undifferenced ambiguity resolution, regular orbit corrections can be used.

Due to the relative stability of the satellite code biases, the provision of the corrections can be simplified by providing the pseudorange minus carrier phase clock difference. However, the least squares estimates of the satellite code biases are affected by station code noise mapped to the satellites, and so both these and the widelane biases may be smoothed a-posteriori. For real-time correction distribution, this is likely to be the optimum method to minimize the bandwidth required to deliver corrections to a user.

Thus, the provision of decoupled satellite clock corrections permits carrier phase ambiguity resolution of a single-receiver user of GPS. With ambiguity resolution possible, PPP-AR with the decoupled clock model has the capability to drastically reduce the observation time required for precise positioning.

The foregoing dissertation respecting the invention can be further understood with reference to the drawings which discussed hereinbelow.

FIG. 1 is a flowchart showing the basic steps to achieve integer ambiguity fixed estimates of position, time and atmosphere (step 70) from single station data (step 50). Single station solutions are computed in a PPP process (step 60) and depend on explicit satellite positions (ephemeris) and clock estimates (step 40). The only source of such estimates is a multiple station solution (step 30) where data from a plurality of widely spread receivers (step 20) are processed. In principle the satellite positions can be estimated at the same time as the satellite clocks, but suitable values from publicly available sources are available (step 10), and can be used in both the multiple- and single-station solutions.

Figure 2:
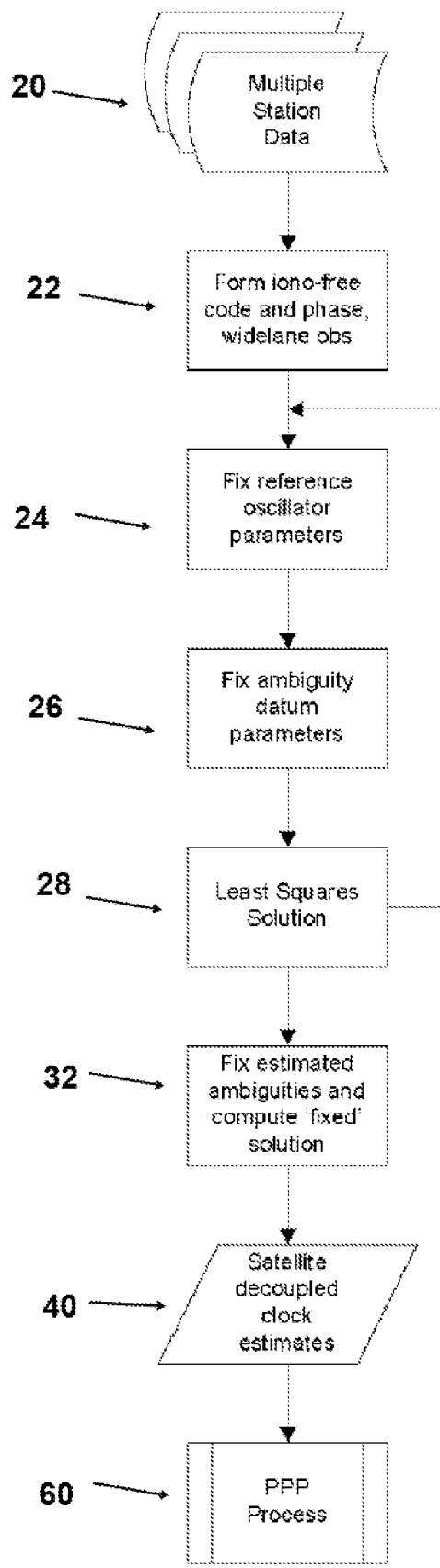
FIG. 2 is a flowchart showing the basic steps of implementing the decoupled clock model with ambiguity datum fixing in a network process.

FIG. 2 is a flowchart showing the basic steps of implementing the decoupled clock model with ambiguity datum fixing in a network process. The minimum purpose of this process is to produce decoupled satellite clock estimates (step 40), for subsequent single-station (PPP) processes (step 60). In the current invention, data from multiple stations is gathered (step 20) and combined into ionosphere-free pseudorange (code), ionosphere-free carrier phase (phase) and widelane/narrowlane observables (step 22). The combinations are formed independently of the processing epoch and other stations, i.e. they are 'undifferenced' in the standard terminology. One oscillator in the system (usually a ground receiver) is designated as a reference station and its code, phase and widelane decoupled clock parameters are held fixed (step 24). For each remaining oscillator in the system, an ambiguity for both the phase and widelane clocks is identified and fixed to an arbitrary integer value (step 26). This fixing procedure allows a minimum constraint least-squares solution to be formed (step 28). Such a solution is not limited to estimating satellite and station clocks and can include, depending on the geometry, station and satellite positions, local atmospheric parameters and other physical parameters not fixed a-priori to suitably precise values. The iterative nature of a least-squares solution permits continual processing with subsequent data from step 22. The result of the least squares solution includes ambiguity parameters that can be fixed to integer values with standard techniques (step 32) to improve the estimates of the other parameters.

Figure 3:
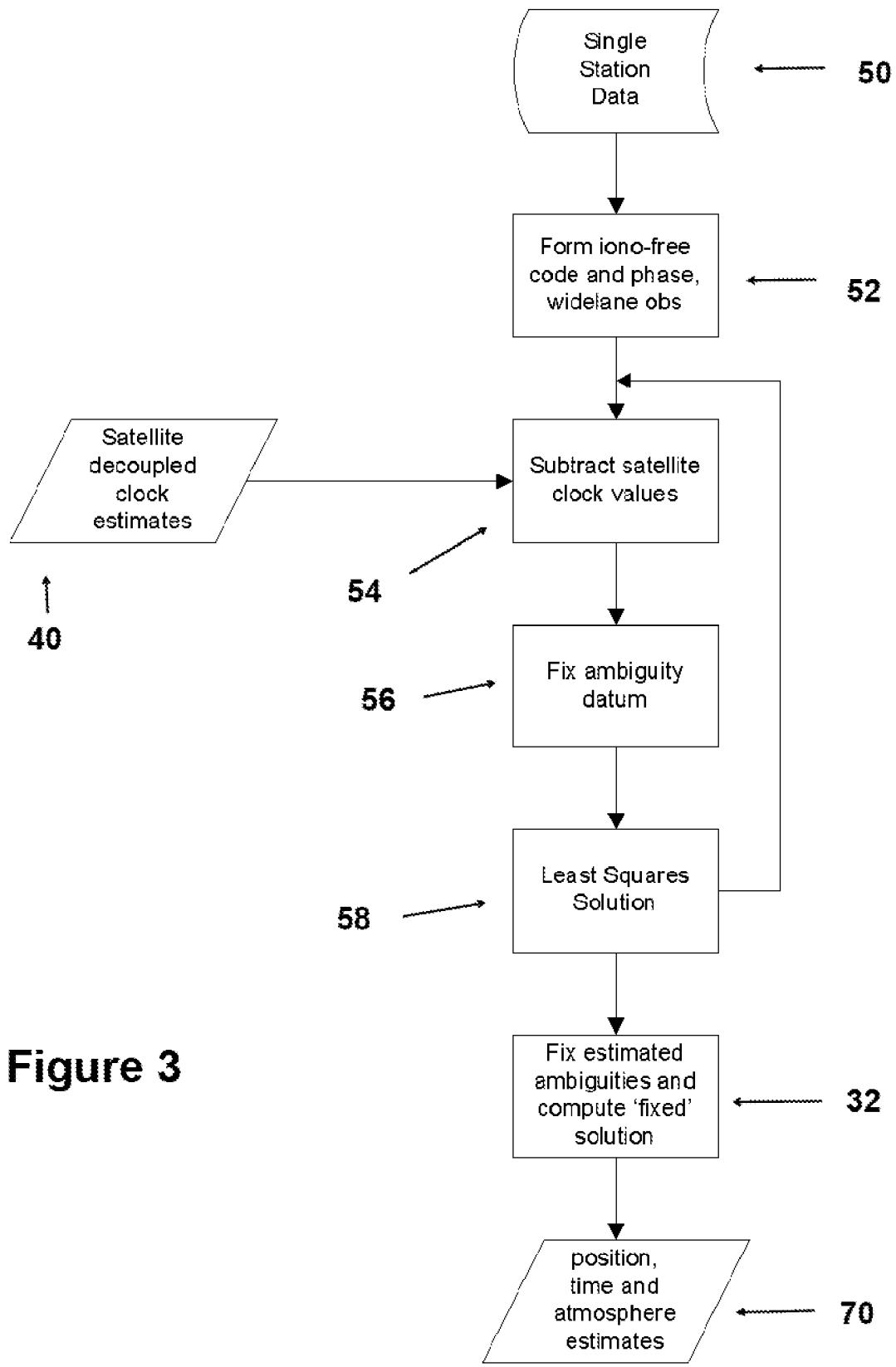
FIG. 3 is a flowchart showing the basic steps of implementing the decoupled clock model with ambiguity datum fixing in a Precise Point Positioning (PPP) process.

FIG. 3 is a flowchart showing the basic steps of implementing the decoupled clock model with ambiguity datum fixing in a Precise Point Positioning (PPP) process. The typical purpose of such a process is to produce precise estimates of position, time and atmosphere (step 70). In the current invention, data from a single station is gathered (step 50) and combined into ionosphere-free pseudorange (code), ionosphere-free carrier phase (phase) and widelane/narrowlane observables (step 52). The decoupled satellite clock estimates from a network solution (step 40) are subtracted from these observables (step 54) to provide the necessary clock datum for a single-station solution. For the remaining station oscillator, an ambiguity for both the phase and widelane clocks is identified and fixed to an arbitrary integer value (step 56). This fixing procedure allows a minimum constraint least-squares solution to be formed (step 58). Such a solution is not limited to estimating the station clocks and usually includes the station position and local atmospheric parameters. The iterative nature of a least-squares solution permits continual processing with subsequent data from step 52. The result of the least squares solution includes ambiguity parameters that can be fixed to integer values with standard techniques (step 32) to produce improved estimates of the other parameters (step 70).

One benefit of the decoupled clock model compared to other recently introduced ambiguity resolution techniques, is that accommodating receivers measuring a different pseudo-range type on either frequency (e.g. Coarse/Acquisition and not Precise on L1) is straightforward, requiring the user to correct for the constant satellite code bias with values which are publicly available, or supplied through an associated correction stream. In a similar manner, any carrier phase quadrature bias can also be corrected.

From a philosophical point of view, the decoupled clock model conforms to the original principles of PPP, and in fact GPS, whereby purely undifferenced observables are used, and all the user-required information is contained in satellite-only corrections. However, it should be stressed that in practice, the decoupled clock model represents a significantly more rigorous model of the GPS observations, and, even without explicit ambiguity resolution, provides more consistent solutions over those provided by the standard undifferenced observation model.

The principle of the decoupled clock model can be extended to the processing of measurements from other, and multiple, Global Navigation Satellite Systems. The requirement for observation-dependent clock parameters is determined by the differing signal structure of each system and the consequent hardware implementations of both the transmitters and the receivers.

Applications of this process involve, for example, use by commercial providers of GPS augmentation services to create a GPS correction stream that could eventually provide near-instant centimeter-level real-time positioning globally. Centimeter-level global positioning can be used in a wide range of applications in positioning, navigation, Earth and atmospheric sciences, from engineering and mapping to machine and missile guidance.

In addition, the new level of performance in navigation provided by the present process has the potential to be used in many government agencies for applications such as atmospheric sounding, water surveys (Environment), precision farming (Agriculture), air/marine navigation, vehicular guidance, (Transport), mapping, geo-hazards (Natural Resources), and lidar and bathymetry surveys (Fisheries and Ocean).

What is claimed is:

1. A method of determining parameters of interest associated with one or more GPS receivers, comprising the steps of:

receiving GPS signals at one or more GPS receivers from a plurality of GPS satellite transmitters;

obtaining from the GPS signals received by the one or more GPS receivers undifferentiated GPS carrier phase and pseudorange measurements, made at two frequencies;

defining separate clock error parameters for the carrier phase and pseudorange measurements;

arbitrarily biasing carrier phase estimates of clock errors with respect to pseudorange estimates of clock errors;

constraining the ambiguity parameters to be integer-valued; and determining parameters of interest associated with the one or more GPS receivers based on the constraint of the integer-valued ambiguity parameters.

2. The method of claim 1 being based on the following relationship:

$$P_1 = \rho + T + I + c(dt_{P1}^r - dt_{P1}^s) + \epsilon_{P1}$$

$$P_2 = \rho + T + q^2 I + c(dt_{P2}^r - dt_{P2}^s) + \epsilon_{P2}$$

$$L_1 = \rho + T - I + c(dt_{L1}^r - dt_{L1}^s) - \lambda_1 N_1 + \epsilon_{L1}$$

$$L_2 = \rho + T - q^2 I + c(dt_{L2}^r - dt_{L2}^s) - \lambda_2 N_2 + \epsilon_{L2}$$

wherein:

$P_i$ is a pseudorange measurement made at frequency i, $L_i$ is an integer ambiguous carrier phase measurement made at frequency i, $N_i$ is the integer ambiguity at frequency i, $\lambda_i$ is the wavelength of the carrier phase measurements at frequency i, $\rho$ is the geometric range between transmitter and receiver antennas, T is the range delay caused by signal propagation through the lower atmosphere (predominantly the Troposphere), I is the range delay and apparent phase advance on the first frequency caused by signal propagation through the upper atmosphere (predominantly the Ionosphere), the factor q is the ratio of the first frequency to the second, the factor c is the vacuum speed of light, $dt_k^j$ is the clock error (combined oscillator and hardware time delay) on measurement k for receiver or transmitter j, $\epsilon_k$ represents unmodelled random or quasi-random errors on measurement k.

3. The method of claim 1 further comprising the step of fixing to arbitrary integer value a subset of ambiguity parameters, whereby a minimum constraint least-squares solution can be computed.

4. The method of claim 1 wherein the steps thereof are applied to the processing of measurements from a plurality of GPS receivers, whereby satellite clock errors therefor are computed.

5. The method of claim 4 comprising the formation of a least squares solution based on the following relationship:

$$P_3 = \rho + T + c(dt_{P3}^r - dt_{P3}^s) + \epsilon_{P3}$$

$$L_3 = \rho + T + c(dt_{L3}^r - dt_{L3}^s) - \lambda_3 N_3 + \epsilon_{L3}$$

wherein:

$P_3$ is a combined pseudorange measurement free of the ionospheric effect to first-order, $L_3$ is a combined integer ambiguous carrier phase measurement free of the ionospheric effect to first-order, $N_3$ is the resulting integer ambiguity, $\lambda_3$ is the ionosphere-free wavelength of the carrier phase measurements, ρ is the geometric range between transmitter and receiver antennas, T is the range delay caused by signal propagation through the lower atmosphere (predominantly the Troposphere), the factor c is the vacuum speed of light, $dt_k^j$ is the clock error (combined ionosphere-free oscillator and hardware time delay) on measurement k for receiver or transmitter j, $\epsilon_k$ represents unmodelled random or quasi-random errors on measurement k, as well as second-and higher-order ionospheric effects.

6. The method of claim 4 further comprising the step of fixing one carrier phase clock parameter as a network datum.

7. The method of claim 4 further comprising the step of fixing one pseudorange clock parameter as a network datum.

8. The method of claim 4 further comprising the step of fixing one ambiguity parameter associated with each estimated carrier phase clock parameter, to an arbitrary integer value.

9. The method of claim 4 further comprising, for certain ionosphere-free combinations, an estimation of a widelane combination of ambiguities, whereby the ionosphere-free wavelength is numerically amplified to that of the narrowlane, such that the use of standard integer fixing techniques is made feasible.

10. The method of claim 9 comprising the formation of a least squares solution based on the following relationship:

$$A_4 = L_4 - P_6 = b_{A4}^r - b_{A4}^s - \lambda_4 N_{4+\epsilon A4}$$

wherein:

$P_6$ is the narrowlane combination of dual-frequency pseudoranges, $L_4$ is the widelane combination of dual-frequency carrier phases, $\lambda_4$ is the widelane wavelength, $N_4$ is the widelane ambiguity, $b_k^j$ is the widelane clock-like error (combined carrier phase and pseudorange hardware time delays) on measurement k for receiver or transmitter j, $\epsilon_k a$ represents unmodelled random or quasi-random errors on measurement k.

11. The method of claim 9 further comprising the step of fixing one widelane clock-like parameter as a network datum.

12. The method of claim 9 further comprising the step of fixing one ambiguity parameter associated with each estimated widelane clock-like parameter, to an arbitrary integer value.

13. The method of claim 5 comprising the steps of:

for certain ionosphere-free combinations, estimating a widelane combination of ambiguities; and one of:
insertion of the estimated widelane integer ambiguities as fixed quantities into the ionosphere-free relationship; and
simultaneous estimation of the widelane and ionosphere-free ambiguities;

whereby the ionosphere-free wavelength is numerically amplified to that of the narrowlane, such that the use of standard integer fixing techniques is made feasible.

14. The method of claim 4 wherein use is made of the satellite clock errors, such that a precise point positioning solution is realized for the processing of measurements from a single GPS receiver.

15. The method of claim 14 comprising the formation of a least squares solution based on the following relationship:

$$P_3 = \rho + T + c(dt_{P3}^r - dt_{P3}^s) + \epsilon_{P3}$$

$$L_3 = \rho + T + c(dt_{L3}^r - dt_{L3}^s) - \lambda_3 N_{3+\epsilon L3}$$

wherein:

$P_3$ is a combined pseudorange measurement free of the ionospheric effect to first-order, $L_3$ is a combined integer ambiguous carrier phase measurement free of the ionospheric effect to first-order, $N_3$ is the resulting integer ambiguity, $\lambda_3$ is the ionosphere-free wavelength of the carrier phase measurements, ρ is the geometric range between transmitter and receiver antennas, T is the range delay caused by signal propagation through the lower atmosphere (predominantly the Troposphere), the factor c is the vacuum speed of light, $dt_k^j$ is the clock error (combined ionosphere-free oscillator and hardware time delay) on measurement k for receiver or transmitter j, $\epsilon_k$ represents unmodelled random or quasi-random errors on measurement k, as well as second-and higher-order ionospheric effects.

16. The method of claim 14 further comprising the step of fixing of the satellite carrier phase clock errors.

17. The method of claim 14 further comprising the step of fixing the satellite pseudorange clock errors.

18. The method of claim 14 further comprising the step of fixing one ambiguity parameter to an arbitrary integer value.

19. The method of claim 14 further comprising, for certain ionosphere-free combinations, an estimation of a widelane combination of ambiguities, whereby the ionosphere-free wavelength is numerically amplified to that of the narrowlane, such that the use of standard integer fixing techniques is made feasible.

20. The method of claim 19 comprising the formation of a least squares solution based on the following relationship:

$$A_4 = L_4 - P_6 = b_{A4}^r - b_{A4}^s - \lambda_4 N_{4+\epsilon A4}$$

wherein:

$P_6$ is the narrowlane combination of dual-frequency pseudoranges, $L_4$ is the widelane combination of dual-frequency carrier phases, $\lambda_4$ is the widelane wavelength, $N_4$ is the widelane ambiguity, $b_k^j$ is the widelane clock-like error (combined carrier phase and pseudorange hardware time delays) on measurement k for receiver or transmitter j, $\epsilon_k$ represents unmodelled random or quasi-random errors on measurement k.

21. The method of claim 19 further comprising the step of fixing the satellite widelane clock-like errors.

22. The method of claim 19 further comprising the step of fixing one ambiguity parameter to an arbitrary integer value.

23. A method of determining GPS information comprising the steps of:

receiving GPS signals at one or more GPS receivers from a plurality of GPS satellite transmitters;

obtaining from the GPS signals undifferenced GPS carrier phase and pseudorange measurements, made at two frequencies, at the one or more GPS receivers;

defining separate clock error parameters for the carrier phase and pseudorange measurements;

arbitrarily biasing carrier phase estimates of clock errors with respect to pseudorange estimates of clock errors;

constraining the ambiguity parameters to be integer-valued; and determining the estimated GPS information of the one or more GPS receivers based on the constraint of the integer-valued ambiguity parameters.

24. A system for determining GPS information comprising:
- one or more GPS receivers for receiving GPS signals from a plurality of GPS satellite transmitters;
- means for obtaining from the GPS signals undifferenced GPS carrier phase and pseudorange measurements, made at two frequencies, at the one or more GPS receivers;
- means for defining separate clock error parameters for the carrier phase and pseudorange measurements;
- means for arbitrarily biasing carrier phase estimates of clock errors with respect to pseudorange estimates of clock errors;
- means for constraining the ambiguity parameters to be integer-valued; and
- means for determining the estimated GPS information of the one or more GPS receivers based on the constraint of the integer-valued ambiguities.

25. The method of claim 1 wherein the parameters of interest include at least one of position coordinates, time and atmosphere estimates.

26. The method of claim 1 wherein the steps of obtaining the carrier phase and peudorange measurements, defining separate clock error parameters, arbitrarily biasing carrier phase estimates, arbitrarily biasing carrier phase estimates of clock errors, and constraining the ambiguity parameters, are performed by the one or more GPS receivers.

27. The method of claim 15 comprising the steps of:
- for certain ionosphere-free combinations, estimating a widelane combination of ambiguities; and
- one of:
    - insertion of the estimated integer widelane ambiguities as fixed quantities into the ionosphere-free relationship; and
    - simultaneous estimation of the widelane and ionosphere-free ambiguities;
- whereby the ionosphere-free wavelength is numerically amplified to that of the narrowlane, such that the use of standard integer fixing techniques is made feasible.

28. The method of claim 23 wherein the GPS information includes at least one of position coordinates, time and atmosphere estimates.

29. The system of claim 24 wherein the GPS information includes at least one of position coordinates, time and atmosphere estimates.

* * * * *